June 12, 1934.                W. R. CARROLL                1,962,581
            DRIVE MECHANISM FOR ROLLING MILLS AND THE LIKE
                    Filed May 25, 1929        3 Sheets-Sheet 1

Inventor
Willard R. Carroll
By Rockwell & Bartholow
Attorneys

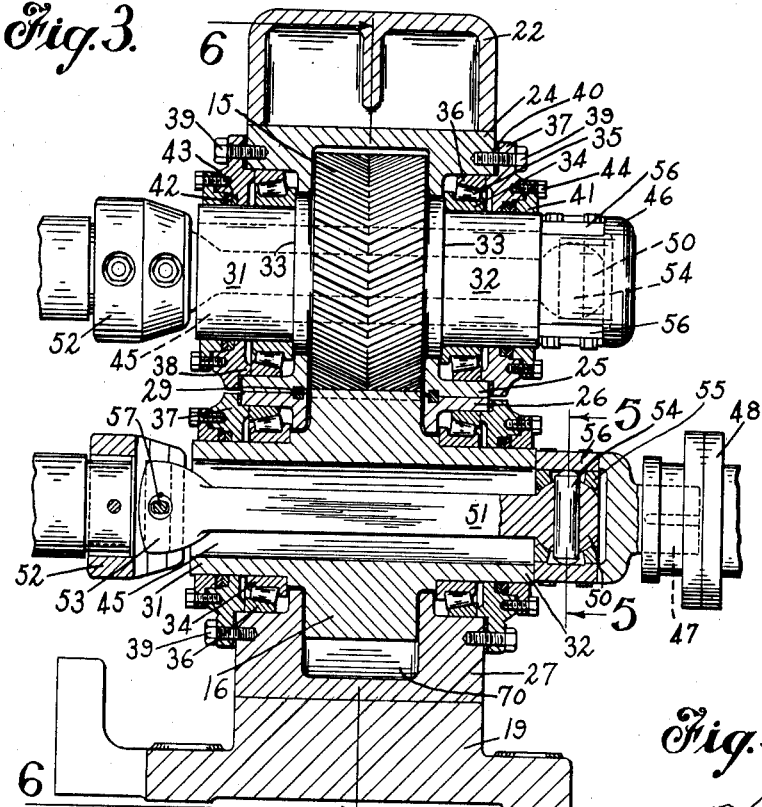
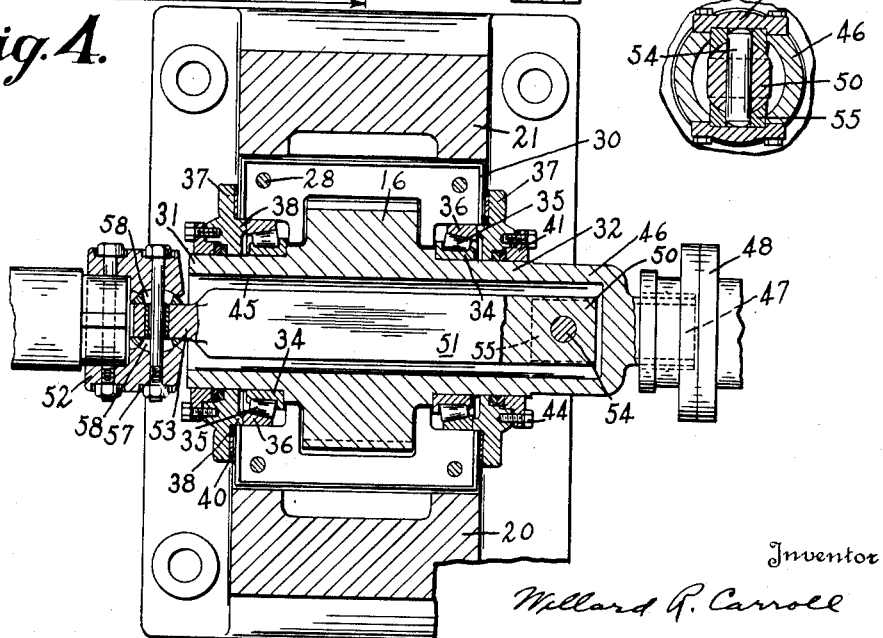

June 12, 1934.  W. R. CARROLL  1,962,581
DRIVE MECHANISM FOR ROLLING MILLS AND THE LIKE
Filed May 25, 1929  3 Sheets-Sheet 3

Inventor
Willard R. Carroll
By Rockwell and Bartholow
Attorneys

Patented June 12, 1934

1,962,581

UNITED STATES PATENT OFFICE 1,962,581

DRIVE MECHANISM FOR ROLLING MILLS AND THE LIKE

Willard R. Carroll, New Haven, Conn., assignor to Farrel-Birmingham Company, Incorporated, Ansonia, Conn.

Application May 25, 1929, Serial No. 366,004

13 Claims. (Cl. 80—54)

This invention relates to rolling mills, and more particularly to improvements in drive mechanisms for rolling mills and the like.

Since the rolls of a rolling mill are usually adjustable relatively to each other, it is desirable that a connection be provided between the rolls and the gears driving them, which will permit such adjustment without decreasing the efficiency of the drive. It has been the practice to connect the rolls to a drive mechanism by means of what are known as wabblers, these wabblers being interposed between the rolls and the respective driving gears, but wabblers are inefficient as driving instrumentalities on account of the loose connection provided, thereby causing loss of power and uneven rotating movements of the rolls. Under conditions where the rolls are rotated slowly, wabblers can be used with some satisfaction by providing a fairly tight fit at their connections with the rolls and gears, but in modern rolling mill practice where the rolls are required to rotate at high speed, wabblers, if used, must be more loosely connected in order to prevent excessive vibration and undue strains upon the bearings, and therefore the efficiency of the mill is greatly decreased. Under the conditions referred to, moreover, mills provided with connections of the wabbler type are unbearably noisy in operation. Still another disadvantage of the use of wabblers arises from the fact that such connections from the drive to the mill take up considerable floor space, and buildings for housing an installation so equipped are necessarily quite large.

Long life of the operating parts with a minimum number of stoppages for repairs is also desirable for rolling mill installations, as in many instances, other departments, and occasionally entire plants, are dependent upon the continuous operation of the rolling mill. This is especially true in wire and cable manufactories, it being very uneconomical and expensive to carry stock ahead in order to offset the effect of possible rolling mill interruptions, due to the value of the product so stored and the interest on the amounts so invested.

To eliminate or overcome the disadvantages and to obtain the advantages above noted is one of the objects of this invention.

Another object is to provide a drive mechanism for a rolling mill or the like, which will be efficient, comparatively inexpensive to manufacture and comparatively quiet in operation.

Another object is to provide a drive mechanism for a rolling mill, which will occupy a minimum amount of floor space.

A still further object of this invention is to provide a drive mechanism of simple and rigid structure, easily assembled and disassembled, and of such arrangement of parts that heat developed by the operation thereof will not noticeably affect the efficiency of the mechanism.

Still further objects are to provide a driving mechanism adapted to more efficiently and uniformly operate the rolls of a rolling mill, having ample lubricating facilities, and to provide a combined rolling mill and driving means therefor, wherein the rolls may be vertically adjusted without affecting the driving means, and operated efficiently and uniformly at high rates of speed.

It has heretofore been the customary practice to construct a drive mechanism by providing a pinion stand having interposed pinions mounted between spaced apart frame members. This invention contemplates an improvement over the usual structure in that the pinions are enclosed in a housing and may be run in oil or other lubricant, the arrangement being such that a single one-piece frame member will be all that is required to support the same. Moreover, each pinion is individually enclosed, and in connection with its own particular housing and its own particular bearings forms a unit which can be set up before installation, and which can be readily installed and removed independently of other such units. The drive mechanism of this invention permits the assembly of each pinion with its bearings before the same is placed in the pinion stand, and this facilitates adjustment of the bearings and accurate alignment thereof, and, as the units are individually removable from the stand, repairs can be made much more conveniently.

To these and other ends, the invention consists in the novel features and combinations of parts to be hereinafter described and claimed.

Figure 2:
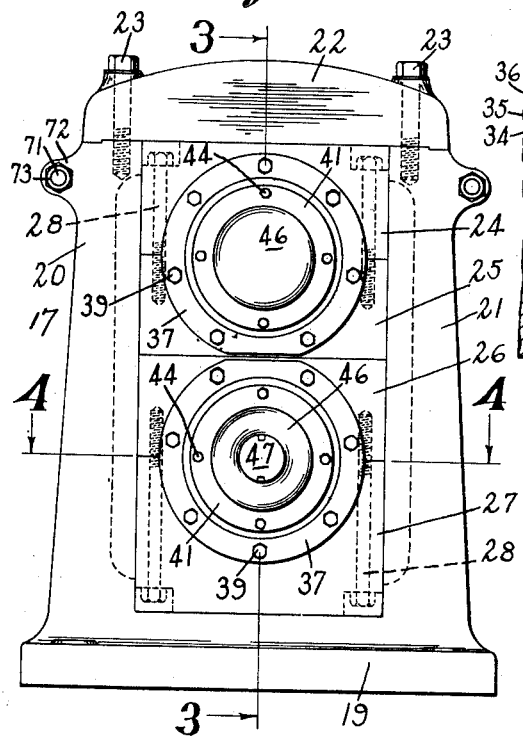
Fig. 2 is an end view of the drive mechanism of this invention.
Figure 8:
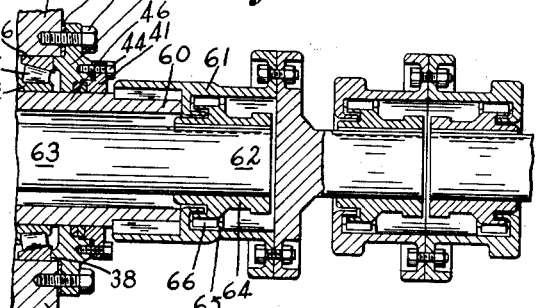
Figure 6:
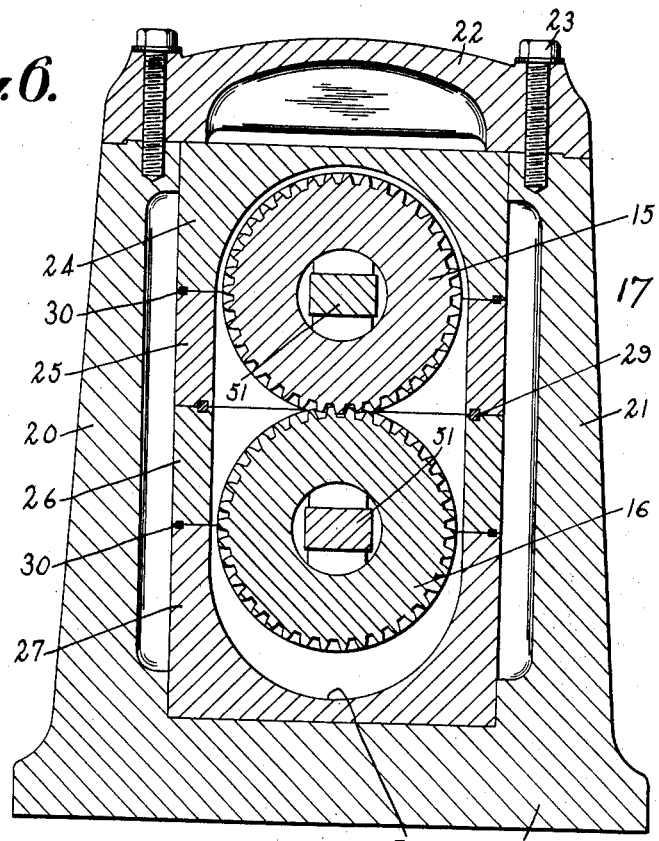
Figure 7:
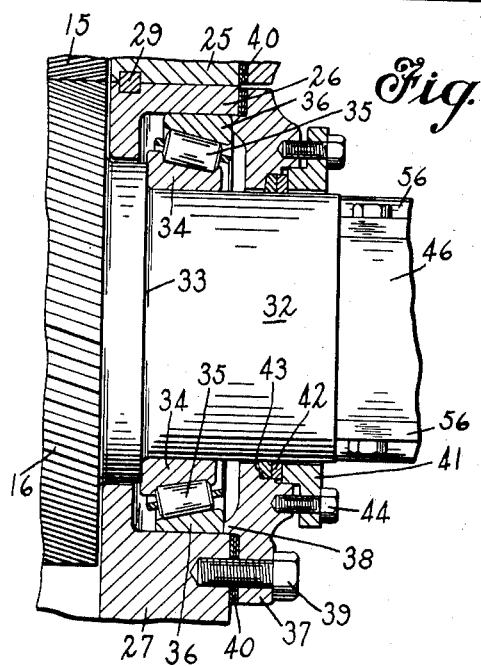

Fig. 3 is a section on line 3—3 of Fig. 2;
Fig. 4 is a section on line 4—4 of Fig. 2;
Fig. 5 is a section on line 5—5 of Fig. 3;
Fig. 6 is a section on line 6—6 of Fig. 3;
Fig. 7 is an enlarged sectional view of a pinion bearing, and
Fig. 8 is an illustration of a somewhat modified form of connection between a pinion and a roll.

Figure 1:
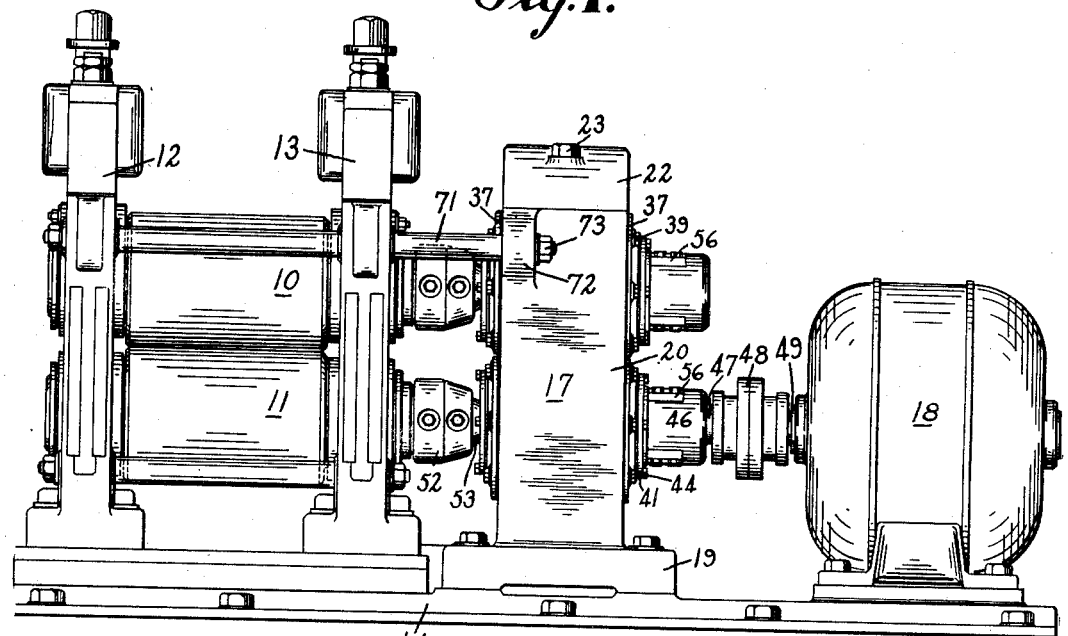
Fig. 1 is a front elevation of a rolling mill, embodying the features of this invention.

A unit of a rolling mill installation embodying the features of this invention is illustrated in Fig. 1, and generally comprises rolls 10 and 11, which are suitably journaled in upright frame members 12 and 13, mounted upon the base 14, and driving mechanism comprising a pair of cooperating pinions 15 and 16, which are mounted in a frame 17 and are driven, in this instance, by a motor 18. The particular rolling mill selected for illustration is a rod mill and the rolls 10 and 11, it is understood, are in practice provided with grooves upon their peripheries to form the desired cross section of rod, but as this invention is not limited to any particular form of roll surface, such grooves are not shown in the drawings.

The body of the frame or pinion stand 17 is U-shaped, comprising a base portion 19 which is mounted upon and secured to base 14, and upstanding front and rear portions or arms 20 and 21, respectively. A cap plate 22 extends across and is bolted to each of the arms 20 and 21 by bolts 23. Pinion supporting blocks or housings are provided for the respective pinions 15 and 16, and are disposed between the arms 20 and 21 of the frame 17, being vertically or horizontally insertable therein. Each of the pinion supporting blocks or housings is formed in two parts, an upper part 24 and a lower part 25 forming the housing for the pinion 15, and upper and lower parts 26 and 27 respectively, forming the housing for the pinion 16. The respective cooperating parts of these housings are separable, being secured together by means of bolts 28.

The lower part 27 of the lower housing is adapted to seat upon the base 19 of the frame, and the lower part 25 of the upper housing to seat upon the upper part 26 of the lower housing. The upper part 24 of the upper housing is engaged by the cap plate 22, which clamps all of the parts together when it is bolted in place by means of the bolts 23. Suitable oil retaining packing is provided between the respective parts of the pinion housings, as is shown at 29, between parts 25 and 26, and at 30 between parts 24 and 25 and between parts 26 and 27, so as to provide an oil-tight common housing enclosing the two intermeshing pinions in a single elongated chamber, as shown in Fig. 6.

The pinions 15 and 16 are each provided with bearing hubs or trunnions 31 and 32 that extend axially from each side of the pinion respectively, and are journaled, in this instance, in antifriction bearings which are disposed in recessed end faces of the pinion housings. These antifriction bearings are preferably roller bearings, as shown. An outwardly directed shoulder 33 is formed upon each of the hubs 31 and 32 of each pinion against which an end of the inner roller race 34 of a roller bearing is disposed. The rollers 35 of the roller bearings are preferably tapered and are disposed with the smaller end of each directed outwardly with respect to the pinion. The outer race 36 of the roller bearing in each instance, fits within the recessed end face of the housing and is arranged to be axially movable therein.

A cover plate 37 is provided to embrace the hub or journal and close the recess in the end face of each housing. Each of the plates 37 is provided with an axially extending rib 38, preferably circular, which is adapted to enter the recess in the housing and abut against and position the outer raceway 36 of the roller bearing therein. The plates 37 are secured to the pinion housings by means of bolts 39, and are spaced from the end face of the housing by shims 40. By varying the thickness of the shims 40, proper axial adjustment of the outer races 36 may be made when initially adjusting the same, or in order to take up any looseness in the bearing caused by wear. Thus is it possible to properly and conveniently position the pinions laterally within the housing and relatively to each other. A stuffing box is provided in the cover plate, and for that purpose a gland 41 is arranged to hold oil retaining material 42 within a recess 43, formed in the outer face of each plate 37. Bolts 44 acting on the gland 41 are adapted to compress the material 42 about the adjacent pinion hub to prevent oil leaking from the housing at this point.

The above described parts may be completely assembled before they are installed between the frame members 20 and 21. For instance, pinion 15 with its bearings, end plates 37 and stuffing box parts, may be assembled within and to the upper and lower housing parts 24 and 25, the bearings aligned and adjusted and the pinion 15 located in position, before these parts are placed in the frame 17. The same is true of the pinion 16 and its corresponding associated parts. Each of the pinions with its associated parts as above described, forms a pinion unit which can be held in readiness to quickly replace a similar unit of a drive mechanism of this invention, in case of necessity. By the above arrangement, an accurate alignment and adjustment of the bearings and pinions can be effected whereby efficient operation thereafter will be made more certain. This arrangement is applicable to other drive mechanisms than the particular one shown and permits either or any of the pinion units to be readily disassembled from the frame without disturbing the remainder, or the adjustments thereof.

The pinions 15 and 16 with their hub portions 31 and 32 are hollow, being provided with a central bore 45. The hub portions 32 of the pinions 15 and 16, in this instance, are provided with extensions 46 which extend outwardly beyond the cover plates 37. The extension 46 of the hub of pinion 16 is further extended as at 47 to adapt it to be secured to a coupling 48, mounted upon the armature shaft 49 of the motor 18. Preferably the coupling 48 is of the type known as a flexible coupling, which is adapted to compensate for possible misalignment between the axes of the shaft 49 and the pinion 16. A portion of each of the extensions 46 is hollow and within the bores thereof the ends 50 of roll-driving bars 51 are disposed. The ends 50 of the bars 51 are connected to the extensions 46 by suitable means to permit universal movement therebetween while providing for the bars being drivingly rotated. The bars 51 extend through the bores 45 of the pinions 15 and 16 toward the rolls 10 and 11, and are drivingly connected thereto by universal connections. Herein I use a coupling 52, secured to each roll, the ends 53 of the bars 51 being in this instance secured to the couplings 52 for universal movement.

In the particular embodiment illustrated, the means providing universal movement between each extension 46 and the corresponding bar end 50, comprises a pin 54 which extends through the bar end 50 and is journaled at its ends in members 55. The members 55 are provided with spherical sockets formed on the inner surfaces thereof and receive the bar ends 50, which are rounded and shaped to fit the same. Rocking movement of the bars 51 about the pins 54 as a pivot is permitted and also rocking movement of the ball-shaped bar ends in the sockets formed in members 55. Cap plates 56 bolted upon the extensions 46 and engaging the members 55 retain the latter in place. A similar arrangement can be used to provide for universal movement between the couplings 52 and the bar ends 53. In the case illustrated, the bar ends 53 are pivotally secured to the couplings 52 by means of bolts 57 and can pivot thereon. Members 58 disposed one on either side of the bar ends 53 are socketed in the couplings 52 and permit rocking movement of the bars.

In the modified form of universal movement connection shown in Fig. 8, the pinion hub extension 60 is keyed or otherwise secured to a part 61 of a flexible coupling. In this form, the end 62 of a connecting bar 63 is keyed or otherwise secured to another coupling part 64. Between the coupling parts 61 and 64 cooperating parts are disposed, comprising internally formed teeth 65 on part 61, and externally formed teeth 66 on part 64. The teeth 65 and 66 are so formed that universal movement is permitted between parts 61 and 64, and, therefore, such movement is permitted between the connecting bar 63 and the pinion hub extension 60.

By means of the above described structure comprising the pinions and hub extensions with the connecting bars extending therethrough and connected to the rolls, the drive mechanism comprising the frame 17 and its associated parts can be disposed closely adjacent the roll frame member 13, whereby the overall length of the combined roll and pinion stand is of minimum dimension and an undue amount of valuable floor space is not required therefor. The construction of the drive mechanism is such that the frame 17 thereof can be directly secured to the adjacent frame 13 of the roll stand. In the example illustrated this is done by continuing the roll mill frame connecting bolts 71 to the frame 17, and through lugs 72 formed thereon, securing the bolts thereto by means of nuts 73. This arrangement insures rigidity in the combined roll and pinion stand. The structure described, while readily permitting the vertical adjustment of the rolls when required, also permits the operation thereof in a uniform, quiet manner and with a minimum amount of vibration due to the universal joints between the connecting bar ends and the respective pinion and roll coupling parts, which joints may be snugly fitted together. The driving torque developed by the motor 18 is by this arrangement very directly transmitted to the rolls, and no appreciable loss in power is experienced.

The provision of roller bearings, the provision of sealed pinion housings and of means to adjust the roller bearings to compensate for wear, also contribute toward the improved operation of a rolling mill of this type. By means of the novel pinion housing arrangement, the pinions and bearings may be properly and effectively lubricated. Oil or other suitable lubricant may be provided in an oil well 70 formed in the lower housing part 27 from which it is carried upwardly by the pinion 16 to pinion 15. During the upward travel of the lubricant, it spreads laterally over the pinion hubs and enters the roller bearings to lubricate the same, excess lubricant draining back into the well 70 for further use in this manner.

The provision of a single frame wherein the pre-assembled pinion units may be placed after being properly adjusted, insures efficient operation, facilitates manufacture and tends to insure long life of the parts due to accurate alignment and adjustment, and due to the arrangement whereby the pinions and bearings may be lubricated. The provision for the removal of either pinion unit from the frame without disturbing the adjustment of the parts of the other pinion unit is particularly advantageous in the case of repairs. No long stoppages of the mill are required, for a complete pre-adjusted unit may be kept at hand for immediate replacement when the defective one is removed, the latter being repaired when convenient.

The housings and the parts for mounting the pinions in their units are symmetrically disposed with respect to the center plane of the pinion bodies. Due to the particular arrangement of the roller bearings and pinion housings, heat developed by the rotation of the pinions and by the bearings therefor, does not adversely affect the operation of the drive mechanism. Such heat is absorbed by the oil or other lubricant and transmitted to the housing parts, such as 27, which are in one piece from one side face to the other and, owing to this and to their symmetrical shape, expand symmetrically with respect to the enclosed pinion. Such expansion might cause a slight separation of the roller bearing parts axially, but the pinion is also affected by the heat and an expansion of the pinion takes place at both sides. When so expanding, the pinion tends to cause the inner races of both roller bearings to move axially outwardly and thus the tendency of a slight separation of the parts of the roller bearing is compensated for, and no bearing strains are experienced.

While I have shown and described a preferred embodiment of my invention, it is understood that it is not to be limited to all of the details shown, but is capable of modification and variation which will lie within the spirit of the invention and the scope of the appended claims.

What I claim is:

1. In a rolling mill, the combination of a roll stand, a pair of rolls therein, a pinion stand located at one side of the roll stand and in close proximity thereto and comprising a frame having a base and upwardly projecting side members, pinion housings located in said frame between said side members and arranged one above the other, said housings having interior communicating chambers, pinions in the respective housings, said pinions intermeshing and each being provided with a hollow shaft extending at the respective ends beyond the corresponding pinion housing, driving bars in said hollow shafts extending from the ends thereof remote from the rolls through the pinions, means for flexibly connecting each driving bar at one end to the pinion shaft and at the opposite end to one of the rolls, and means at that side of the pinion stand remote from the rolls for rotating one of the pinion shafts and thereby driving the pinions and rolls.

2. In a rolling mill, the combination of a roll stand, cooperating rolls therein, a vertically arranged pinion stand at one side of the roll stand and in close proximity thereto, intermeshing pinions in said pinion stand one above the other, said pinions having hollow shafts extending beyond the pinion stand on opposite sides of the latter, driving bars in said hollow shafts connected at the far side of the pinion stand beyond the pinion bearings to the pinions and at the opposite side of the stand to the rolls, and means at the first-named side of the stand connected to one of the shafts at the end thereof for rotating said shaft and thereby driving the pinions and rolls.

3. In a rolling mill, a roll stand, cooperating rolls therein, a pinion stand at one side of the roll stand comprising a frame having a base and upwardly projecting side members, pinions in said pinion stand one above the other, said pinions intermeshing, housings enclosing the respective pinions and located between said upwardly projecting members of the pinion frame, said housings being open at the respective sides of the pinion stand, anti-friction bearings in the housings, cap members closing the openings in the housings at the sides of the pinion stand and cooperating with the anti-friction bearings to hold the latter in place on the pinion shafts, and driving connections between the pinion shafts and the rolls.

4. In a rolling mill, a roll stand, cooperating rolls therein, a vertical pinion stand at one side of the roll stand comprising a base, upwardly projecting side members, and a top cross-member, pinions in said pinion stand one above the other, at least one of said pinions having a hollow shaft projecting beyond the sides of the pinion stand, a bar in said hollow shaft connected to said shaft at one side of the pinion stand and connected to one of said rolls at the other side of the pinion stand, means for connecting the other pinion shaft with the other roll, and means for rotating one of the pinion shafts to drive the pinions and thereby the rolls.

5. In a rolling mill, a roll stand, cooperating rolls therein, a vertical pinion stand at one side of the roll stand comprising a base, upwardly projecting side members, and a top cross-member, pinions in said pinion stand one above the other, at least one of said pinions having a hollow shaft, a bar in said hollow shaft connected to said shaft at one side of the pinion stand and connected to one of said rolls at the other side of the pinion stand, means for connecting the other pinion shaft with the other roll, and means for rotating one of the pinion shafts to drive the pinions and thereby the rolls, said pinion stand including in its construction hollow housings enclosing the respective pinions and arranged one on top of another between said side members, each housing and its enclosed pinion being separately removable from the pinion stand.

6. In a rolling mill, a roll stand, cooperating rolls therein, a vertical pinion stand at one side of the roll stand comprising a base, upwardly projecting side members, and a top cross-member, pinions in said pinion stand one above the other, at least one of said pinions having a hollow shaft projecting beyond the sides of the pinion stand, a bar in said hollow shaft connected to said shaft at one side of the pinion stand and connected to one of said rolls at the other side of the pinion stand, means for connecting the other pinion shaft with the other roll, and means for rotating one of the pinion shafts to drive the pinions and thereby the rolls, said pinion stand including in its construction hollow housings one on top of another, said housings each being sectional and having closure caps at the sides of the pinion stand by means of which the pinions are adjusted laterally.

7. In a rolling mill, the combination of a roll stand, a pinion stand vertically arranged at one side of and in close proximity to the roll stand, a pair of intermeshing pinions in said pinion stand one above the other, at least one of said pinions having a hollow shaft extending beyond the respective sides of the pinion stand, bearings for said shaft at the respective sides of the pinion stand, a driving bar located in said hollow shaft and flexibly connected with said shaft at one side of the stand at a point located outwardly of the corresponding shaft bearing, means at the opposite side of the pinion stand located outwardly with respect to the corresponding shaft bearing for connecting said shaft to one of the mill rolls, means for connecting the other pinion with another mill roll, and means for driving said pinions.

8. In a rolling mill, a pinion stand comprising a base member and upwardly projecting side members, a pinion in said stand between said side members having a shaft projecting beyond the respective sides of the pinion stand, a hollow enclosing block for said pinion located in said stand between said side members and having openings at the sides of the stand, cap closures for said openings carried by the block and adjustable with respect to the block, anti-friction bearing members embracing the pinion shaft at opposite sides of the pinion and held in place by said cap closures, said cap closures being adapted to adjust the pinion laterally in the stand, and means for connecting the pinion shaft with one of the mill rolls.

9. In a rolling mill, a pinion stand comprising a base and side members projecting upwardly from the base, a pinion located between said side members and having a shaft projecting beyond the sides or faces of the pinion stand, a hollow housing member between the side members of the pinion stand enclosing the pinion, said housing member being made in upper and lower sections and being open at the respective sides of the pinion stand, anti-friction bearing members supported in the housing member and encircling the pinion shaft at the respective sides of the pinion stand, and adjustable closure members for the open ends of the housing member carried by said housing member and impinging against said anti-friction bearing members so as to permit lateral adjustment of the pinion in the housing.

10. In a rolling mill, the combination of a roll stand, cooperating rolls therein, a vertically arranged pinion stand at one side of the roll stand, intermeshing pinions in said pinion stand one above the other, said pinions having shafts extending beyond the pinion stand on opposite sides of the latter, housings enclosing said pinions within said pinion stand, means associated with the housings for adjusting each pinion laterally in the pinion stand independently of the other, means for connecting the pinion shafts with the rolls, and means for rotating one of the pinion shafts and thereby driving the pinions and rolls.

11. In a rolling mill, a pinion stand having a base and side members projecting upwardly from the base, interengaging pinions located between said side members one above the other, each pinion having a shaft projecting from opposite sides thereof, individual housings enclosing said pinions, said housings located one on top of another and fitting between said side members and supported on said base, an upper member removably secured to said side members for holding said housings in place in said frame, said housings engaging said side members and being formed of hollow blocks which are individually and independently removable from the stand with their appurtenant pinions, means connecting the pinion shafts with the rolls, and means for rotating one of the pinion shafts and thereby driving the rolls and pinions.

12. In a rolling mill, a pinion stand comprising a base member, side members projecting upwardly from the base member and a cross top member, hollow rectangular blocks set in the space defined by said base, side members and cross-member and arranged in superposed relation, a pinion enclosed within the upper block, a pinion enclosed within the lower block and meshing with the first pinion, said pinions having shafts projecting outwardly from said blocks, means associated with the blocks for adjusting the pinions laterally independently of each other, means at one side of the pinion stand for connecting the pinion shafts with the rolls, and means at the opposite side of the pinion stand for rotating one of the pinion shafts and thereby driving the pinions and rolls.

13. In a rolling mill, the combination of a roll stand, cooperating rolls therein, a pinion stand at one side of the roll stand comprising a frame having a base and upwardly projecting side members, pinions in said pinion stand one above the other, said pinions intermeshing, separate housings enclosing the respective pinions fitting between said side members and supported on said base, one on top of the other, said housings engaging said side members and having intercommunicating chambers, an upper member removably secured to said side members for holding said housings in place in said frame, each housing with its enclosed pinion being separately removable from said frame, means for connecting said pinions with the rolls, and means for driving the pinions and thereby the rolls.

WILLARD R. CARROLL.